United States Patent
Tomofuji

(10) Patent No.: US 9,628,668 B2
(45) Date of Patent: Apr. 18, 2017

(54) ELECTRONIC DEVICE AND AUTHENTICATION METHOD THEREIN

(71) Applicant: KYOCERA Document Solutions Inc., Osaka (JP)

(72) Inventor: Shinji Tomofuji, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/055,585

(22) Filed: Feb. 27, 2016

(65) Prior Publication Data

US 2016/0255244 A1    Sep. 1, 2016

(30) Foreign Application Priority Data

Feb. 27, 2015  (JP) ................. 2015-038221

(51) Int. Cl.
| | |
|---|---|
| *H04N 1/04* | (2006.01) |
| *H04N 1/44* | (2006.01) |
| *G06F 21/31* | (2013.01) |
| *H04N 1/00* | (2006.01) |
| *G06F 21/60* | (2013.01) |

(52) U.S. Cl.
CPC .......... *H04N 1/4413* (2013.01); *G06F 21/31* (2013.01); *G06F 21/608* (2013.01); *H04N 1/00411* (2013.01); *H04N 1/4426* (2013.01); *H04N 2201/0094* (2013.01)

(58) Field of Classification Search
CPC ............. H04N 1/4413; H04N 1/00411; H04N 1/4426; H04N 2201/0094
USPC ....................... 358/1.14, 1.15, 1.9
See application file for complete search history.

(56) References Cited

FOREIGN PATENT DOCUMENTS

| | | | | |
|---|---|---|---|---|
| JP | 2012-150530 | * | 8/2012 | ............... H04N 1/00 |
| JP | 2012-150530 A | | 8/2012 | |
| JP | 2014-059767 A | | 4/2014 | |

\* cited by examiner

*Primary Examiner* — Houshang Safaipour
(74) *Attorney, Agent, or Firm* — Hawaii Patent Services; Nathaniel K. Fedde; Kenton N. Fedde

(57) ABSTRACT

Provided is an electronic device and an authentication method able to restrict and disable an operation when a third person other than an authorized user who is registered as a user, and prevent information leakage without requiring the user a complicated operation. At a time when an operator inputs an authentication request by any one of the user identification numbers, when first information inputted via the input part is coincided with the first password related to the user identification number for which the authentication request is inputted, and when characteristic data at a time when the first information is inputted falls within a specified range of a histogram of the databases related to the user identification number for which the authentication request is inputted, the operator is authenticated as the user for which the authentication request is inputted.

7 Claims, 7 Drawing Sheets

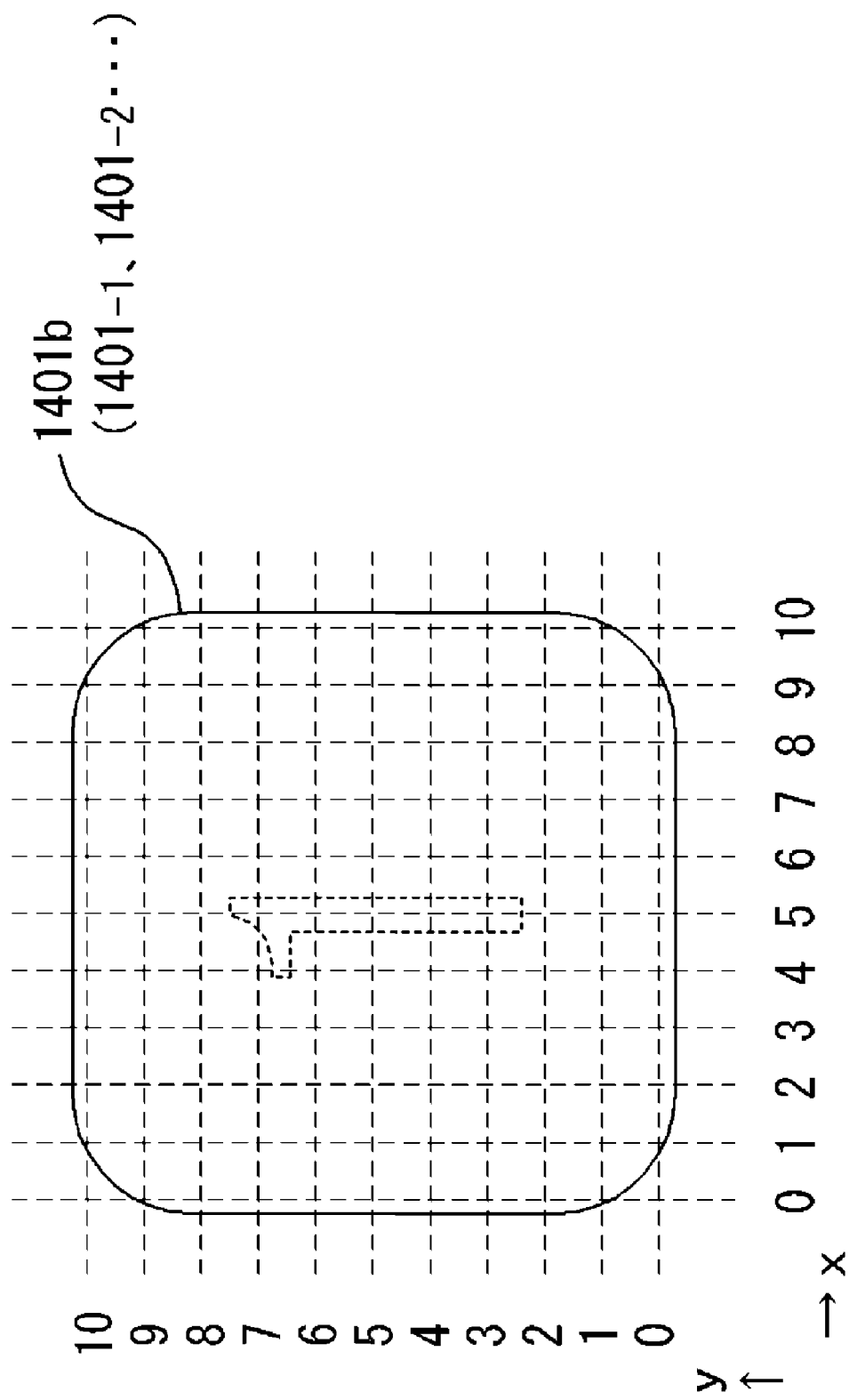

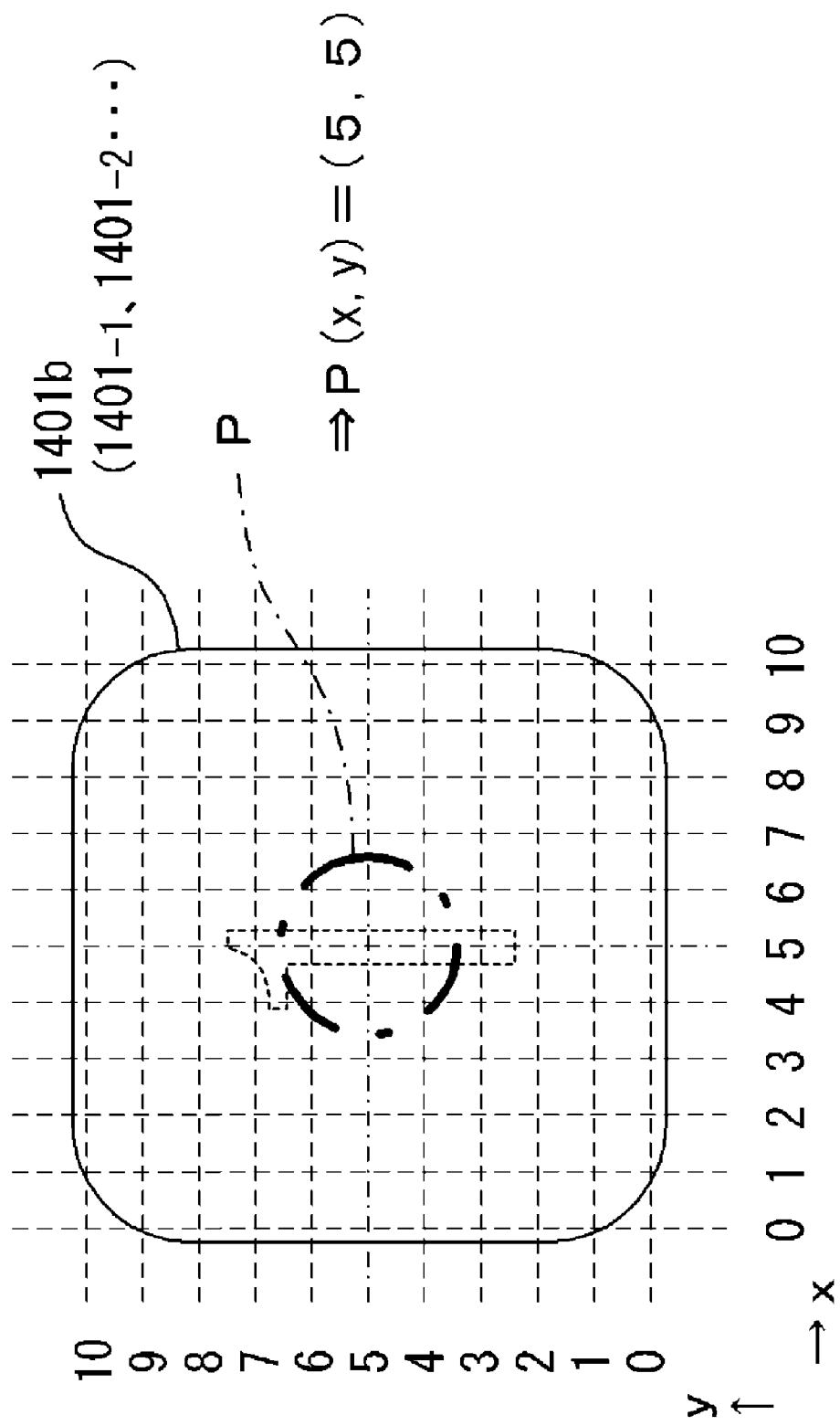

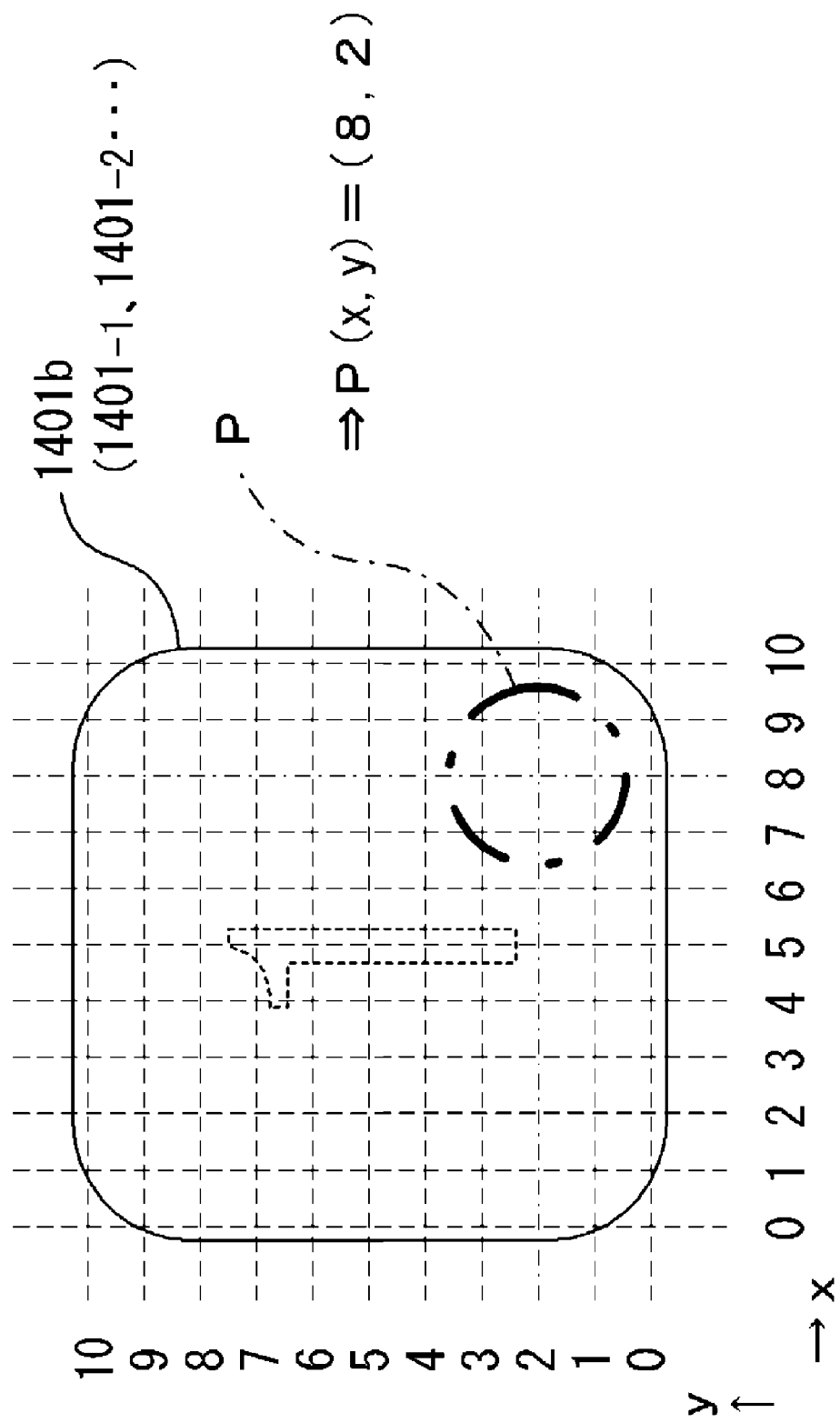

ELECTRONIC DEVICE AND AUTHENTICATION METHOD THEREIN

INCORPORATION BY REFERENCE

This application is based on and claims the benefit of priority from Japanese Patent Application No. 2015-038221 filed on Feb. 27, 2015, the entire contents of which are hereby incorporated by reference.

BACKGROUND

The present disclosure relates to an electronic device with a security function for imposing restrictions on a person other than an authenticated user who is accepted user registration and for preventing information leakage, and an authentication method implemented in the electronic device.

Electronic devices have been utilized not only to store information in large quantities and accurately but also to store high confidential information and information about individual privacy information. Thus, high security is increasingly requested for extracting information from the electronic devices and utilizing the electronic devices.

As an example of security, there has been proposed a method in which an authenticated user previously registers a password (including a personal identification number). At a time when using an electronic device, the password is inputted to authenticate as a user. Thereby, this electronic device becomes available.

In addition, the password and personal identification number are prone to be difficult to learn and easy to forget. In view of this, there has also been proposed a method in which a user accepts user authentication by showing a drawing pattern.

In order to enhance a security level by the aid of the password authentication or the drawing pattern authentication, there has been proposed heretofore various technologies.

For example, plural sensors are provided at the side surface of a mobile type electronic device to input a password or a drawing pattern. In addition to this operation, an operation pattern other than a button operation and a touch panel operation is used to authenticate a user.

Moreover, even if authentication is accepted by such a password, when, for example, the mobile type electronic device is lost, there is a fear that the security may be broken by Brute-force attack. Thus, there has also been proposed a technology to deal with such Brute-force attack. This technology determines that the device is illegally used by a person other than the authorized user when characteristics of an operation at a time when a user authentication is accepted are different from those of an authorized user who is accepted user registration. Thereby, the subsequent operations of the electronic device are made invalid.

When an electronic device is shared by a plurality of users whose passwords are separately registered, an authenticated user sometimes may leave from the electronic device without performing an authentication end processing and a utilization end processing such as a log out. Then, there is a fear, for example, that information or the like about the authenticated user is stolen illegally by an unauthenticated person or the like. There is also a fear of leakage of various information from the electronic device. The aforesaid technology also has an effect of preventing such an illegal utilization.

SUMMARY

According to an aspect of the present disclosure, an electronic device of the present disclosure includes an input part and a storage part. The input part is configured to input various information by an operator including one or more users. The storage part is configured to store individual information about each of the one or more users. Further, the storage part holds a user identification number for the users, a first password for the users, and a database that is configured to store various characteristic data at a time when the users input at least the first password via the input part as mutually related one set, at a time when an operator inputs an authentication request by any one of the user identification numbers stored in the storage part, when first information inputted via the input part is coincided with the first password related to the user identification number for which the authentication request is inputted, and the various information characteristic data at a time when the first information is inputted via the input part fall within a specified region previously set to a histogram accumulated in the data base related to the user identification number for which the authentication request is inputted, the operator is authorized as a user related to the user identification number for which the authentication request is inputted.

According to another aspect of the present disclosure, an authentication method of the present disclosure is an authentication method that is implemented in an electronic device including an input part that is configured for an operator to input various pieces of information, the operator being each of one or more users, and a storage part that is configured to store a respective piece of information of each of the one or more users, the method including: causing the storage part to hold a respective piece of information of each of the one or more users, the respective piece of information being in the form of a mutually related set of a user identification number for each of the one or more users, a first password for each of the one or more users, and a database that is configured to store various pieces of characteristic data that are involved in at least an inputting of the first password via the input part that is conducted by each of the one or more users; and authenticating an operator as a user who is related to the user identification number that is inputted at a time of the authentication request in a case where the operator conducts an input for requesting an authentication relied on any one of the user identification numbers that are stored in the storage part, when a first piece of information that is inputted via the input part is in coincidence with the first password that is related to the user identification number of the inputted authentication request and concurrently when each of the various pieces of information at a time of inputting the first information via the input part falls within a specified region that is set relative to a histogram that the data base indicates that is related to the user identification number of the inputted authentication.

BRIEF DESCRIPTION OF THE DRAWINGS

FIG. 4A is a view showing how to find coordinates (x, y) of a pressing point P of the present exemplary embodiment;

FIG. 4B is a view showing how to find coordinates (x, y) of a pressing point P of the present exemplary embodiment;

FIG. 4C is a view showing how to find coordinates (x, y) of a pressing point P of the present exemplary embodiment.

DETAILED DESCRIPTION

Next, with reference to the accompanying drawings, an exemplary embodiment of the present disclosure will be specifically described. In the present exemplary embodiment, as an image forming device, a description will be made to one example in which an MFP (Multi Function peripheral) is used. It is to be noted that parts or elements which are uncharacteristic in the present disclosure and have little relation to a characteristic part of the present disclosure, their reference numbers and descriptions are omitted.

Figure 1:
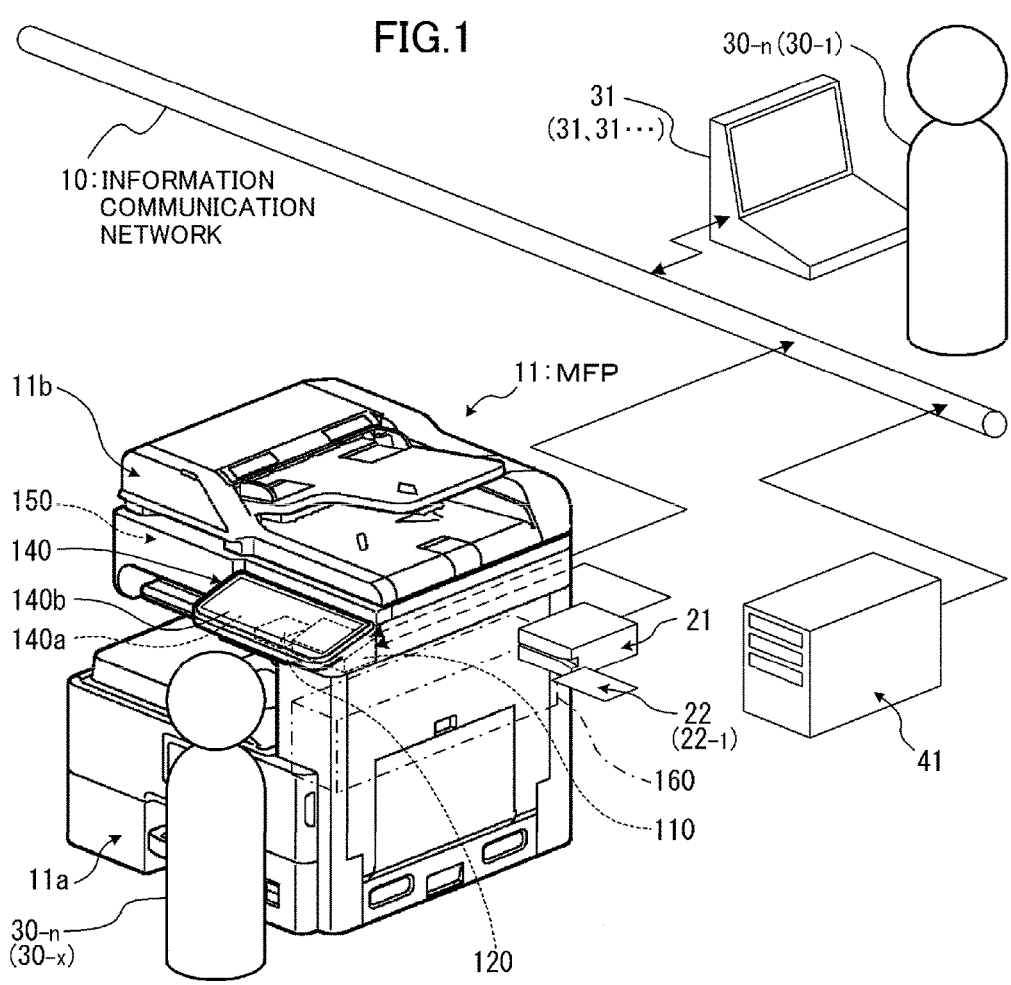
FIG. 1 is a view showing a configuration and usage examples of an MFP 11 according to each of exemplary embodiments of the present disclosure.

With reference to FIG. 1, an MFP 11 is made up of a main body 11a and an ADF (Auto Document Feeder) mounted on the main body 11a. On an upper part of the main body 11a, there is provided an image reading part 150 to optically read an image of a manuscript, for example.

At a front side of the main body 11a, there is provided an operation display part 140. The operation display part 140 is provided at an easily visible position when a user places a document on the main body 11a for conducting operations, such as copying, facsimile transmission, or the like.

This operation display part 140 includes a display part 140a, a touch panel 140b mounted on an upper surface of the display part 140a, or the like.

The touch panel 140b of the present exemplary embodiment can detect a position of a pressing point. The touch panel 140b can also detect pressing value (pressing force). The touch panel 140b per se is already known. The touch panel 140b acts as an input part for one or more users to input various information.

The operation display part 140 includes a control part 110 and a storage part 120. The control part 110 has various communication interfaces and a clocking function. The various communication interfaces exchanges image data and operation instruction command information between an information communication network 10. Additionally, a card reader 21 is connected to the various communication interfaces. The various communication interfaces read from an ID card 22 a user identification number or a log-in number. Also, various information can be written into the IC card 22.

The storage part 120 is a non-transitory recording medium. Various operating programs for the MFP 11 of the present exemplary embodiment are previously written in the storage part 120. In addition, image data is written into the storage part 120 when a scanning or printing operation is conducted.

Further, plural database regions are reserved in the storage part 120. In the present exemplary embodiment, the databases are indicated by DN-n, DP-n, DV-n, and Dt-n. These databases will be detailed later. Further, temporary regions for temporally holding the contents of the databases are also reserved in the storage part 120. In the present exemplary embodiment, these temporal regions are indicated by DN', DP', DV', and Dt'. These temporary regions will be detailed later.

In the present exemplary embodiment, these databases are provided in the storage portion 120 for each of plural users $30_{-n}$ ($30_{-1}$, $30_{-2}$, and others). The reason is for successive accumulation of characteristic data when the touch panel 140b is operated.

Incidentally, when characteristic data is successively accumulated, accumulating characteristic data of a user (for example, $30_{-x}$) other than authorized users $30_{-n}$ who are registered as a user will result in a lack of accuracy of the database. The reason is that the database accumulates the characteristic data of the authorized user $30_{-n}$.

Thus, in a case where when another person other than the authorized user $30_{-n}$ uses the database and when another person other than the authorized user $30_{-n}$ is not authenticated as an authorized user, the database is restored to its original state with the contents held in the temporary region. By doing so, only the characteristic data of the authorized users $30_{-n}$ are accurately accumulated.

In addition, user identification numbers $ID_{-n}$ are registered correspondingly with the plural authorized users $30_{-n}$. $PW_{n-1}$ is also registered correspondingly with the respective plural users $30_{-n}$ as a first password correlated to the respective user identification numbers. Further, $PW_{n-2}$ is also registered correspondingly with the respective plural users $30_{-n}$ as a second password.

Besides, the aforementioned operation display part 140 is also provided with a light emitting display unit, a voice notification unit, and other unit. However, detailed descriptions of their units are omitted for the sake of brevity.

Moreover, information terminals 31, 31, and others, a mail server 41, and other equipment in addition to the MFP 11 are connected to the information communication network 10 in the present exemplary embodiment.

The control part 110 included in the MFP 11 creates electronic information such as a standard sentence electronic mail addressed to the users $30_{-n}$ who uses the information terminals 31. Further, the control part 110 has a function to store the electronic mail in the mail server 41.

The other information terminal 31 has a function to notify the user $30_{-n}$ when the email addressed to the users $30_{-n}$ is stored in the mail server 41.

Besides this, the main part 11a is also provided with a print part 160. The print part 160 forms an image on a print sheet with toner. This is performed when the MFP 11 copies a document, when the MFP 11 prints a received facsimile document, or when the MFP 11 acts as a printer in response to an external data input.

Figure 2:
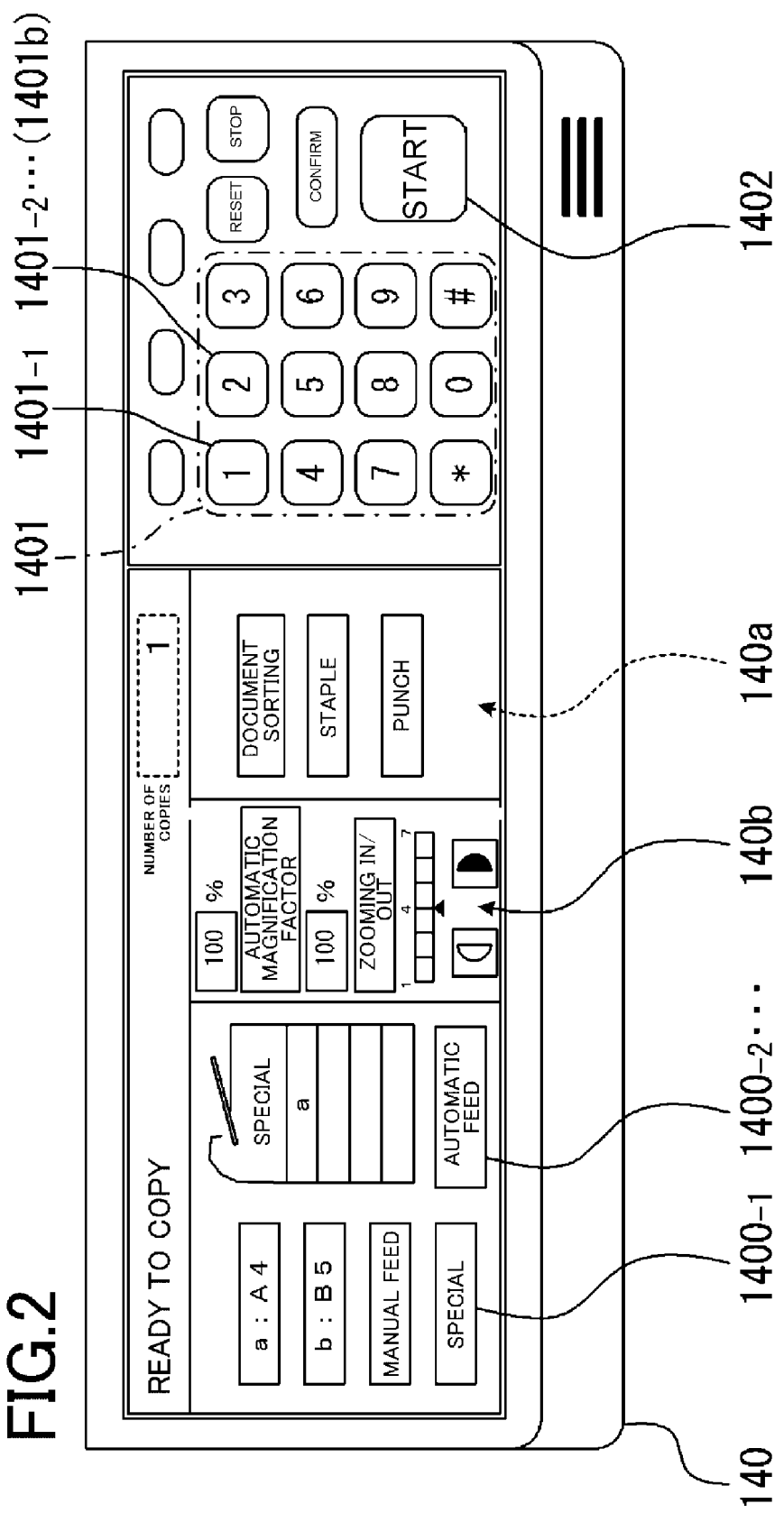
FIG. 2 is a view showing a display example of an operation display part 140 of the present exemplary embodiment.

FIG. 2 shows a state of display of the display part 140 provided in the operation display part 140. On the display part 140a, plural symbols $1400_{-1}$, $1400_{-2}$, and others are displayed. These symbols $1400_{-1}$, $1400_{-2}$ and others are used for selectively inputting "document size", "paper size", and the like. The symbols $1400_{-1}$, $1400_{-2}$ and others are also called as icons or buttons. The icons and buttons are provided to enable touch panel operations on the figures. Further, in the present exemplary embodiment, the symbols $1400_{-1}$, $1400_{-2}$ and others are displayed from a left side to a middle portion on the operation display part 140.

Moreover, buttons $1401_{-1}$, $1402_{-2}$, and others, and a start button 1402 are displayed on the operation display part 140. The buttons $1401_{-1}$, $1402_{-2}$ and others are symbols for inputting a user authentication or a designated numerical value. In the present exemplary embodiment, these buttons are generally displayed at a right side of the operation display part 140. It is to be noted that a portion on which the buttons $1401_{-1}$, $1402_{-2}$ and others are provided is collectively referred to as a numeric button part 1401.

Hereinbelow, a description will be made to an operation by the control part 110, unless otherwise stated. Further, in the present exemplary embodiment, any combination of Arabic numerals "0", "1", "2", "3", "4", "5", "6", "7", "8", and "9" is treated as a password as a matter of convenience.

Processing to be described herein is processing for authenticating that a user is an authorized user at a time when the MFP 11 is used. Thus, in the present exemplary embodiment, a description will be made to a case where the user $30_{-1}$ is authorized by the user identification number ID-1 of the user $30_{-1}$ among the plural users $30_{-1}$ and attempts to log-in the MFP 11.

Figure 3:
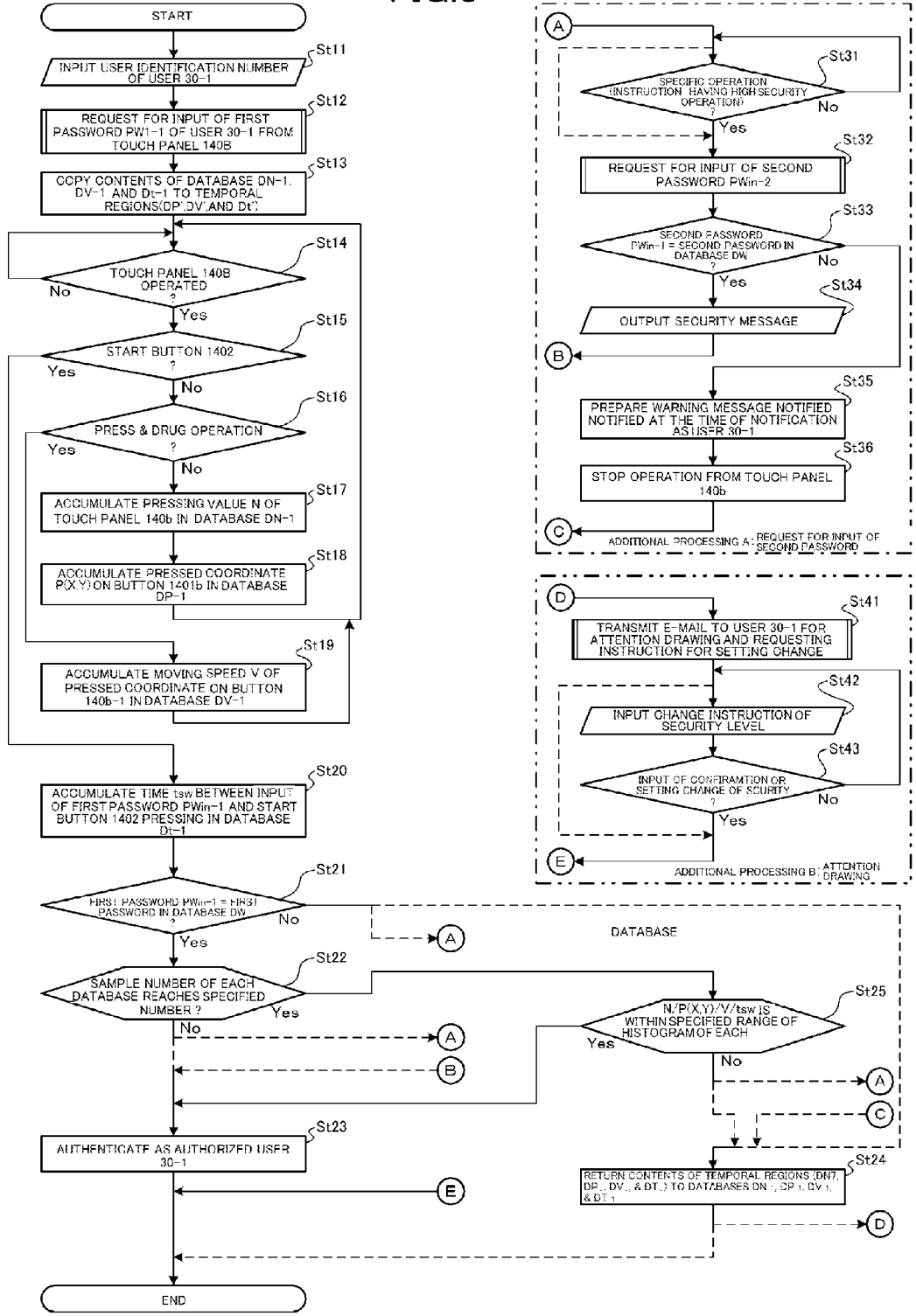
FIG. 3 is a view (flowchart) showing an example of a flow of an authentication processing according to the present disclosure.

With reference to FIG. 3, the user identification number of the user $30_{-1}$ is first inputted (Step St11). At this stage, the user identification number is inputted by operating a specific number of buttons among the buttons $1401_{-1}$, $1401_{-2}$, and others on the operation display part. Or otherwise, an inputting is made by reading an ID card $22_{-1}$ using a card reader 21.

When the user identification number is inputted an input request for a first password $PW_{1-1}$ of the user $30_{-1}$ is displayed on a portion of the touch panel 140b on which the buttons $1401_{-1}$, $1401_{-2}$, and others are displayed (Step St2). Hereinafter, the first password inputted by the operator through the touch panel 140b will be referred to as a first password $PW_{in-1}$ to distinguish from the first password $PW_{1-1}$ registered in the storage part 120. Then, the contents of the databases $DN_{-1}$, $DP_{-1}$, $DV_{-1}$, and $Dt_{-1}$ reserved in the storage part 120 are copied into the temporary regions DN', DP', DV', and Dt', respectively (Step St13).

This database $DN_{-1}$ ($DN_n$) accumulates a pressing value N on the touch panel 140b that is characteristic data of an operation conducted by the user $30_{-1}$ ($30_{-n}$).

Further, the temporary region DN' holds the contents of database $DN_{-1}$ immediately before the accumulation of the pressing value N of the user $30_{-1}$. This is, for example, to invalidate the pressing value N of the user $30_{-x}$ accumulated in the database $D_{n-1}$ when an operation is conducted by the user $30_{-x}$ despite an attempt to accept authentication by the user $30_{-1}$.

On the other hand, the data base $DP_{-1}$ (DP-n) accumulates pressing coordinates P(x, y) that are character data of each of the buttons $1401_{-1}$, $1401_{-2}$, and others when the user $30_{-1}$ ($30_{-n}$) operates each of the buttons $1401_{-1}$, $1401_{-2}$, and others. In addition, the temporary region DP' is, for example, for holding the contents of the data base $DP_{-1}$ immediately before the accumulation of the pressing point coordinates P(x, y) when the user $30_{-x}$ conducts the operation.

The touch panel 140b of the present exemplary embodiment is configured, as shown in FIG. 4A, to detect pressing point coordinates P(x, y) of each of regions of the button 1401b. In other words, the regions are the button $1401_{-1}$, $1402_{-2}$, and others.

This is due to the fact that whether which region of the button $1401_{-1}$ is pressed varies from the user $30_{-n}$ to the user $30_{-n}$ when the button 1401b is operated (pressed). That is, such a variation is appropriable to the characteristic data.

For example, as shown in FIG. 4B, in a case where a user who has a tendency to press the button 1401b so as to cover a numeric figure or a character, accumulating the coordinates P (x, y) of the pressing points results in, for example, a distribution with a point (5, 5) as the center. Meanwhile, as shown in FIG. 4C, in a case where a user who has a tendency to press the button 1401b while watching a numeric figure or a character, accumulating the coordinates P (x, y) of the pressing points results in, for example, a distribution with a point (8, 2) as the center.

Figure 5:
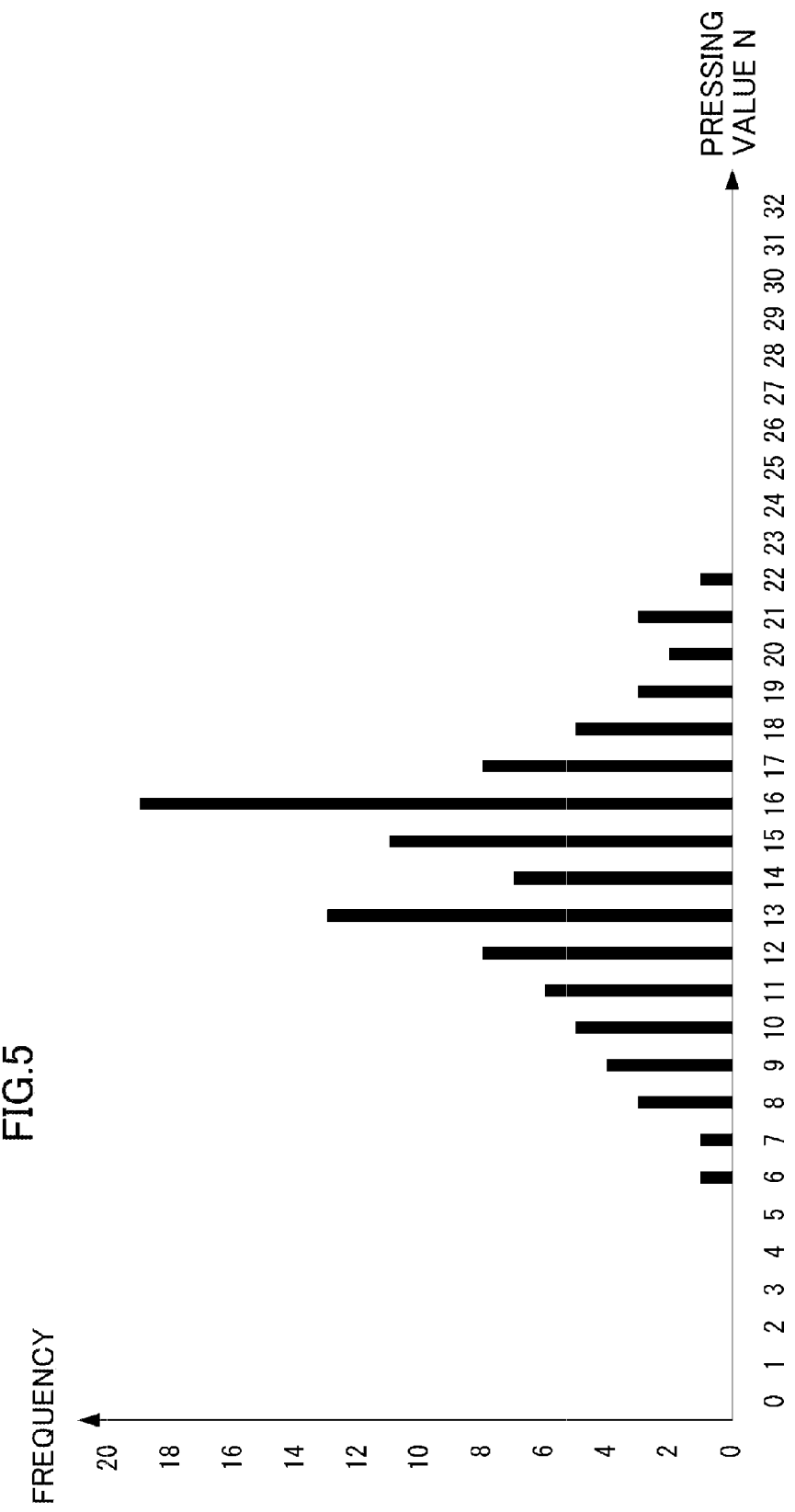
FIG. 5 is a view showing an example of a histogram accumulated in a database of the present exemplary embodiment.

A tendency of the pressing value N also varies from the users ($30_{-n}$) to the users ($30_{-n}$). For this reason, such a variation is appropriable to the characteristic data. Accumulating pressing values N of the button $1401_{-1}$, $1402_{-2}$, and others forms a histogram as shown in FIG. 5. It is to be note that the unit of the pressing value N is not defined here because the present exemplary embodiment is a mere example.

In FIG. 5, FREQUENCY indicates the number of samples. For example, in the data base $DN_{-1}$, the number of samples is 1 when the pressing value N is 6, the number of samples is 1 when the pressing value N is 7, and the number of samples is 3 when the pressing value N is 8.

Although an illustration is omitted, even for the aforementioned coordinate points P (x, y), they can be expressed in the form of a histogram by accumulating them. Because the present exemplary embodiment is a mere example, no definition is made as to whether each of x and y should be treated as a one dimensional value or x and y treated as a two dimensional value.

The aforementioned database $DV_{-1}$ ($DV_{-n}$) accumulates a moving speed V that is characteristic data of an operation conducted by the user $30_{-1}$ ($30_{-n}$). In addition, the temporary region DV' holds the contents of the database $DV_{-1}$ immediately before the moving speed V is accumulated.

This moving speed V means a moving amount of an operation per unit time in operations involving movements of the depression pressure point on the touch panel 140b, such as drag and drop, swipe, and flick. Because the present exemplary embodiment is a mere example, no definitions are made here as to the unit of the moving speed V and to whether the moving speed V is a scalar quantity or a vector quantity.

The aforementioned database $Dt_{-1}$ (Dt-n) accumulates a time (an idle time) $t_{sw}$ that is characteristic data of an operation conducted by the user $30_{-1}$ ($30_{-n}$). The time $t_{sw}$ is a time from the time when an operation on the numeric button part 1401 is completed to the time when the start button 1402 is pressed. The temporary region Dt' holds the contents of the database $Dt_{-1}$ immediately before the time $t_{sw}$ is accumulated by the user $30_{-x}$.

In this connection, even for the moving speed V and the time $t_{sw}$, they can be expressed in the form of histograms by accumulating them. However, in the present exemplary embodiment, their illustrations and detailed descriptions are omitted for the sake of brevity.

After the aforementioned Step St13, the process waits until an operation on the touch panel 140b is confirmed (Step St14).

After an operation of the touch panel 140b is confirmed, unless this is not an operation of pressing the start button 1402 (Step St15) and an operation with movement while pressing (Step St16), the pressing value N on the touch panel 140b is accumulated in the database DN-1 (Step St17).

In this connection, if the number of samples (the number of accumulations) reaches an upper limit value (for example, 100), the oldest characteristic data (pressing value N) is deleted. Then, the newly obtained characteristic data is accumulated. This prevents an unnecessary increase of the capacity (required capacity) of the database $DN_{-1}$. Similarly, the same thing holds true for the other databases $DP_{-1}$, $DV_{-1}$, and $Dt_{-1}$.

After the pressing value N is accumulated in Step St17, the coordinates (x, y) on the pressing point of the button 1401b is accumulated in the database $DP_{-1}$ (Step St18). Then, the process returns black to Step St14 (wait until the next digit of the first password $PW_{in-1}$ is inputted).

In addition, at a time when such the first password $PW_{in-1}$ is inputted, if the operation on the touch panel 140b is an operation with movement while pressing, the moving speed V of the pressing point on touch panel 140*b* is accumulated in the database $DV_{-1}$. Then, the control returns to Step St14.

When the start button 1402 is pressed in the aforementioned Step St15, it is determined that an input of the first password $PW_{in-1}$ is completed. In this case, the time from the time when the operation of the number button part 1401 is completed till the time when the start button 1402 is pressed is accumulated in the database $D_{t-1}$ (Step St20).

Next, a confirmation is made whether or not the first password $PW_{1-1}$ of the user 30$_{-1}$ written in the storage part 120 is coincided with the inputted first password $PW_{in-1}$ (Step St21). At this stage, the first password of the user 30$_{-n}$ is taken as a first password $PW_{n-1}$.

If it is confirmed in Step St21 that the first password $PW_{1-1}$ is coincided with the inputted first password $PW_{in-1}$, then, a confirmation is made as to whether or not the number of samples reaches a specified value for each of the databases $DN_{-1}$, $DP_{-1}$, $DV_{-1}$, and $Dt_{-1}$ (Step St22).

If the specified value is less than the aforementioned upper limit value, it becomes difficult to accurately compare the characteristic data of a user who is inputting the first password $PW_{1-1}$ and the characteristic data accumulated in the database.

Thus, in the present exemplary embodiment, the number of samples shall be the same as the upper limit value. In addition, if the number of samples of each of the databases $DN_{-1}$, $DP_{-1}$, $DV_{-1}$, and $Dt_{-1}$ is less than the specified number, only the user's characteristic data is accumulated in each of the databases $DN_{-1}$, $DP_{-1}$, $DV_{-1}$, and $Dt_{-1}$. Then, no reference is made to histograms.

It is to be noted that in a case where a reference to the histogram of each of the databases is unable, it is impossible to confirm whether or not an authentication request is issued by an authorized user who is registered as a user. Thus, in such a case, a request of an input of the second password allows enhancement of the security level, which will be detailed later.

In other words, if the result indicates that the number of samples of each of the databases $DN_{-1}$, $DP_{-1}$, $DV_{-1}$, and $Dt_{-1}$ is less than the specified value in the aforementioned Step St22, authentication is performed determining that an operation is conducted by the user 30$_{-1}$ (Step St23). Then, the authentication processing is terminated.

Otherwise, if the first password $PW_{1-1}$ is not coincided with the inputted first password $PW_{in-1}$ in the aforementioned Step St21, authentication is not performed determining that the operation is conducted by a person other than the user 30$_{-1}$. In this case, the databases $DN_{-1}$, $DP_{-1}$, $DV_{-1}$, and $Dt_{-1}$ are restored to their original states with the contents copied into the temporary regions DN', DP', DV', and Dt' in Step St13, respectively (Step St24).

More specifically, the characteristic data of the person other than the user 30$_{-1}$ is accumulated in the databases $DN_{-1}$, $DP_{-1}$, $DV_{-1}$, and $Dt_{-1}$. Thus, the contents of the databases $DN_{-1}$, $DP_{-1}$, $DV_{-1}$, and $Dt_{-1}$ are restored to the states before the first password $PW_{in-1}$ is inputted, and then, the processing is terminated.

If the first password $PW_{1-1}$ is not coincided with the inputted first password $PW_{in-1}$ in the aforementioned Step St21, authentication may be performed by inputting a second password. This allows an increase in the convenience without lowering the security level. In brief, the utilization of the other user cannot be obstructed, which will be detailed later.

In addition, in a case where no authentication is made as a registered, authorized user, an e-mail may be transmitted to the user 30$_{-1}$ concurrently with the processing in Step St24. This attracts user's attention. It is to be noted that this processing may be executed immediately after Step St24 or substituted for Step St24, which will be detailed later.

If the number of samples of each of the databases $DN_{-1}$, $DP_{-1}$, $DV_{-1}$, and $Dt_{-1}$ reaches the specified value in Step St22, a confirmation is made whether or not each of the characteristic data of the user who is inputting the first password $PW_{in-1}$ falls within a specific range of the histogram accumulated in each of the databases (Step St25).

At this stage, for example, in a case where the specified range is set between the minimum and maximum values of the histogram in FIG. 5, if the pressing value N is 16, this value falls within the range from the minimum value to the maximum value of the histogram of the database $DN_{-1}$.

Further, even for the coordinates P (x, y), the moving speed V, and the time $t_{sw}$, if each of them falls within the specified range of the histogram of each of the databases $DN_{-1}$, $DP_{-1}$, $DV_{-1}$, and $Dt_{-1}$, the process proceeds to Step St23. Then, authentication is performed determining that the operation is conducted by the user 30$_{-1}$.

On the other hand, for example, in a case where the specified rage is set between the minimum and maximum values of the histogram in FIG. 5, if the pressing value N is 26, this value deviates from between the range from the minimum value to the maximum value in the histogram of the database $DN_{-1}$.

In such a case, it is determined that the operation is conducted by a person other than the user 30$_{-1}$. By doing so, the process proceeds to Step St24 without performing authentication. Then, the databases $DN_{-1}$, $DP_{-1}$, $DV_{-1}$, and $Dt_{-1}$ are restored to the states with the contents copied into the databases DN', DP', DV', and Dt'.

More specifically, the characteristic data other than the user 30$_{-1}$ is accumulated in the databases $DN_{-1}$, $DP_{-1}$, $DV_{-1}$, and $Dt_{-1}$. For this reason, the contents of the databases $DN_{-1}$, $DP_{-1}$, $DV_{-1}$, and $Dt_{-1}$ are restored to the states before an input of the first password $Pw_{in-1}$.

However, though the operation is conducted by the user 30$_{-1}$, it sometimes can occur for some reason that each of the characteristic data of the user who is inputting the first password $Pw_{in-1}$ may not fall within the specified range of the histogram accumulated in the databases.

Then, even in such a case, requesting for inputting a second password will increase the security level.

Here, a description will be made as to an input request for a second password when in the aforementioned Step St22, the number of samples of each of the databases is less than the specified value, that is, when the histogram of each of the databases is not referred, and when in Step St25, the characteristic data deviates from the specified range of each of the databases.

An additional processing A that is a second password input request is shown within a one-dotted line frame in FIG. 3.

In the additional processing A, first of all, a confirmation is made as to whether or not there is an instruction of high level security (Step St31). The instruction of the high level security involves, for example, extraction of high security information from the storage part 120 of the MFP 11 or a facsimile transmission after reading a document.

At this stage, an operation may be performed in response to an instruction, such as maintenance or reading of a document. However, even during these operations, a confirmation is repeatedly made in Step St31 as to whether or not there is an instruction of high level security.

Further, after a specified time elapsed from the time when the operations are completed, such as, the maintenance or the reading of the document, or after a specified time elapsed with an instruction of the high level security absent, the authentication processing is terminated.

Otherwise, if there is an instruction of high level security in Step St31, a request for an input of the second password $PW_{in-2}$ is made (Step St32). Hereinbelow, to distinguish the second password $PW_{1-2}$ registered in the storage part 120, the password inputted by the user via the touch panel 140b shall be referred as "second password $PW_{in-2}$". When the second password $PW_{in-2}$ is inputted, a confirmation is made as to whether or not the second password $PW_{1-2}$ of the user $30_{-1}$ (the second password of the user 30, is taken as a second password $PW_{n-2}$) written in the storage part 120 is coincided with the inputted second password $PW_{in-2}$ (Step St33).

If the second password $PW_{1-2}$ is coincided with the second password $PW_{in-2}$ in step St33, a security message is displayed, for example, on the display part 140a (Step St34).

Thereafter, the process proceeds to Step St23 where authentication is performed (more specifically, determining that the operation is conducted by the user $30_{-1}$) and the authentication processing is terminated.

Examples of the security message when the authentication is performed using the second password are "TOO STRONG PRESSING on TOUCH PANEL ACTIVATES SECULITY FUNCTION" or "DOES SECULITY FUNCTION FOR PRESSING ON TOUCH PANEL CONTINUE TO BE ENABLED?" Displaying such a message on the display part 140a will prompt the user who is frequently requested to input a second password to reconsider the security level.

In this case, the display part 140a displays options, for example, "CONTINUE TO BE ENABLED" and "INVALIDITE". Thereby, it becomes possible to request the user $30_{-1}$ to reconsider the security level.

If the second password $PW_{1-2}$ is not coincided with the second password $PW_{in-2}$ in Step St33, a warning message is prepared for the next time (at Step St11). This warning message will be displayed on the display part 140a when a user identification number is inputted to accept authentication as the user $30_{-1}$.

Then, reception of operations including the user authentication request from the touch panel 140b is stopped (Step St36). Though not illustrated, after a specified time elapsed, the operations, such as the maintenance or the reading of the document are terminated.

Thereafter, the process proceeds to Step St24. Then, in Step St13, the databases $DN_{-1}$, $DP_{-1}$, $DV_{-1}$, and $Dt_{-1}$ are restored to their original states with the contents copied into the temporary regions DN', DP', DV', and Dt', respectively. That is, it is determined that the operation is conducted by a person other than the user $30_{-1}$. Then, the authentication processing is terminated.

Examples of the warning message in Step St35 when authentication is failed even by using the second password include, for example, "ANOTHER USER MAY LOG-IN TO YOUR ACCOUNT", "IS ID CARD STOLEN?", "IS PASSWORD LEAKED ?", and "DO YOU FORGET TO LOG-OUT AFTER OPERATION COMPLETION?".

It is possible to notify theses warning messages from the display part 140a. Besides, similar to an additional processing B to be detailed later, a E-mail is available.

It is to be noted that in this additional processing A, after waiting an instruction of a higher security level (Step St31), a request for an input of the second password $PW_{in-2}$ is made. Instead, it may be possible to make a request for an input of the second password $PW_{in-2}$ regardless of whether or not there is an instruction of a higher security level.

Similarly, it may be possible for each of the users to select whether or not to wait an instruction of a higher security level.

Furthermore, a description will be made here to attracting attention to the user $30_{-1}$ after the databases $DN_{-1}$, $DP_{-1}$, $DV_{-1}$, and $Dt_{-1}$ are restored to their original states with the contents copied into the temporary regions DN', DP', DV', and Dt', respectively, in the abovementioned step St24. The additional processing B for attracting attention to the user $30_{-1}$ is shown within a two-dotted line framework in FIG. 3.

In the attention attracting processing, first of all, an e-mail is created containing information notifying the user $30_{-1}$ that there might have been a possible unauthorized authentication request. Then, this e-mail is stored in a specified region (a specific address) of a mail server 41 (Step St41).

Here, examples of the information to be noted by the e-mail include a message that "There is a possibility that another user may have already logged in your account." It is to be noted that there are various flows to confirm the user $30_{-1}$ the contents of the e-mail stored in the mail server 41.

The user $30_{-1}$ who is notified by the e-mail that there might have been an authorized authentication request by another user, as necessary, inputs an instruction to change the security level to the MFP 11 (Step St42).

Changing the security level is to expand the specified range set in the histogram accumulated in each of the databases and to re-accumulate the characteristic data of the user $30_{-1}$. This is performed in a case where a personnel authentication of the user $30_{-1}$ is failed from the characteristic data in spite of the fact that, for example, the user $30_{-1}$ inputs the first password $PW_{in-1}$.

In addition, in a case where the operation is determined to be conducted unintentionally by another user other than the user $30_{-1}$, for example, the authentication by the user identification number of the user $30_{-1}$ is immediately terminated.

Further, changing the security level includes changing the first password $PW_{1-1}$ and the second password $PW_{1-2}$.

In the present exemplary embodiment, a check is made repetitively whether or not the notification is received by the e-mail from the user $30_{-1}$ or whether or not a change instruction in the security level is inputted (Step St43), until the input is confirmed in Step St42. When the input is confirmed, the authentication processing is terminated.

As described above, according to the exemplary embodiment of the present disclosure, the user identification numbers, the first passwords $PW_{n-1}$, and the second passwords $PW_{n-2}$, are registered correspondingly with each of the plural users $30_{-n}$. Simultaneously, characteristic data of the operations conducted by the users $30_{-n}$ are accumulated in the databases $DN_{-n}$, $DP_{-n}$, $DV_{-n}$, and $D_{t-n}$. Then, the histograms of these databases are found. In response to an authentication request by any user 30-n which relies on user identification number, when the inputted first password $PW_{in-1}$ is coincided with the registered first password $PW_{n-1}$ and when the values of the characteristic data of the operation including those while inputting the first password $PW_{in-1}$ fall within the specified ranges of the histograms accumulated in the databases, authentication is performed determining that an operation is conducted by the user $30_{-n}$ of the user identification number for which the authentication request is made.

When the values of the characteristic data of the operations including those while inputting the first password $PW_{in-1}$ deviate from the specified ranges of the histograms accumulated in the databases, the operation instruction that is not requested to have high security level is executed without performing authentication as an authorized user. On the other hand, when an operation requested to have high level security is instructed, an input of a second password $PW_{in-2}$ is requested. When the inputted second password $PW_{in-2}$ is coincided with the registered second password $PW_{n-2}$, authentication is performed determining that the operation is conducted by the user $30_{-n}$.

Moreover, when the first password $PW_{in-1}$ is not coincided with the first password $PW_{n-1}$ or when the second password $PW_{in-2}$ is not coincided with the second password $PW_{n-2}$, such in coincidence is notified to the user $30_{-n}$ by the aid of electronic information. Then, attention is attracted to change the security level by, for example, changing the first password, the second password, and the specified range of the histogram.

Thereby, for example, mere stealing of the first password not leads to unauthorized authentication.

In addition, even though a user deviates, for some reason, from the characteristics of the authorized user, at a time when the first password is inputted, authentication can be accepted as the authorized user by dint of the second password. Thus, it seldom obstructs utilization of other authorized users due to an inoperable state of the MFP 11.

Moreover, notification is transmitted by, for example, an e-mail to a probable user who may suffer from unauthorized authentication. Thus, it is possible to expect effects not only prevention of the unauthorized authentication, which include, but also identification of the unauthorized user.

As described above, according to the present disclosure, the present disclosure makes it possible to restrict or disable an operation when a third person other than the authorized user who is registered as a user performs an operation without requiring the user a complicated operation. This prevents information leakage.

In summary, in a typical system, once an operation of an electronic information device is disabled, persons other than the unauthorized user will become unable to use the electronic information device. That is, the convenience of the authorized users whose passwords are registered is drastically impaired.

The present disclosure is made in view of the above circumstances. According to the present disclosure, the present disclosure makes it possible to restrict or disable an operation conducted by a third person other than an authorized user who is registered as a user without requesting the user to conduct a complicated operation. This provides an electronic device capable of preventing information leakage and an authentic method implemented in the electronic device.

It is quite apparent that the present disclosure is not necessarily limited to the abovementioned embodiments, and thus various modifications may be made within the technical scope of the present disclosure.

For example, the operation display part 140 is not limited to a combination of the display part 140a and the touch panel 140b. For example, the operation display part 140 may be a configuration in which an LCD and a pointing device capable of finding the coordinates of the pressing point are provided, or a keyboard of pushbutton switch type is arranged.

Alternatively, a configuration may be adopted in which a password inputted via keyboard on which plural pushbutton switches are arranged. Even adopting such a configuration, characteristic data of a user's operation can be obtained by correctly finding and accumulating pushing timing (time interval) of a push button switch.

Still alternatively, in the present exemplar embodiment the pressing value N, the coordinates P (x, y) of the pressing point, the moving speed V, and the idle time $T_{sw}$ are used as the characteristic data accumulated in the databases. However, the present disclosure may use at least one of them and other parameters, not necessarily limited thereto.

What is claimed is:

1. An authentication method implemented in an electronic device, the electronic device including:
   an input part that is configured for an operator to input various pieces of information, the operator being each of one or more users, and
   a storage part that is configured to store a respective piece of information of each of the one or more users, the method comprising:
   causing the storage part to hold a respective piece of information of each of the one or more users,
   the respective piece of information being in the form of a mutually related set of a user identification number for each of the one or more users,
   a first password for each of the one or more users, and a database that is configured to store various pieces of characteristic data that are involved in at least an inputting of the first password via the input part that is conducted by each of the one or more users; and
   authenticating an operator as a user who is related to the user identification number that is inputted at a time of the authentication request in a case where the operator conducts an input for requesting an authentication relied on any one of the user identification numbers that are stored in the storage part,
   when a first piece of information that is inputted via the input part is in coincidence with the first password that is related to the user identification number of the inputted authentication request and
   concurrently when each of the various pieces of information at a time of inputting the first information via the input part falls within a specified region that is set relative to a histogram that the data base indicates that is related to the user identification number of the inputted authentication.

2. The authentication method implemented in an electronic device according to claim 1, wherein when the operator is authenticated as the user who is related to the user identification number for which the authentication request is inputted,
   the various characteristic data at a time when the first information is inputted via the input part is accumulated in each of the database.

3. The authentication method implemented in the electronic device according to claim 1, wherein the storage part stores a second password of a user, wherein
   when each of the various information data at a time when the first information is inputted via the input part deviates from the specified region previously set to the histogram accumulated in the data base related to the user identification number for which the authentication request is inputted,
   the operator is requested to input second information, and wherein when the second information inputted by the operator is coincided with the second password related to the user identification number by which the authentication request is inputted,
   the operator is authenticated as a user who is related to the user identification number for which the authentication request is inputted.

4. The authentication method implemented in the electronic device according to claim 3, wherein when the second information inputted by the operator is not coincided with the second password related to the user identification number for which the authentication request is inputted, an input of all the various information including the input of the authentication request via the input part is stopped.

5. The authentication method implemented in the electronic device according to claim 1, wherein the input part includes a touch panel, and wherein as the various characteristic data at a time when the first password is inputted via the input part, one or more parameters are used including a pressing value on the touch panel, pressing coordinates of each of plural button regions arranged on the touch panel, a moving speed of a pressing point on the touch panel, and a time between two specified operations previously set on the touch panel.

6. The authentication method implemented in the electronic device according to claim 1, wherein the electronic device includes a card reader that is configured to read an ID card in which the user identification number of the user is written, and the authentication request is inputted by the user identification number by causing the card reader to read the ID card by the operator.

7. The authentication method implemented in the electronic device according to claim 1, wherein when the operator who inputs the authentication request is failed to be authenticated as a user, electronic information is created which is addressed to the user related to the user identification for which the authentication request is inputted, and the electronic information is stored in a mail server to be connected to an information network together with information terminals in order for each of one or more of the users to input various information.

* * * * *